US011663560B2

United States Patent
Goja

(10) Patent No.: US 11,663,560 B2
(45) Date of Patent: May 30, 2023

(54) SYSTEMS, METHODS, APPARATUSES AND COMPUTER PROGRAM PRODUCTS FOR PROVIDING NOTIFICATION OF ITEMS FOR PICKUP AND DELIVERY

(71) Applicant: United Parcel Service of America, Inc., Atlanta, GA (US)

(72) Inventor: Asheesh Goja, Upper Saddle River, NJ (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

(21) Appl. No.: 17/867,104

(22) Filed: Jul. 18, 2022

(65) Prior Publication Data
US 2022/0351155 A1    Nov. 3, 2022

Related U.S. Application Data

(63) Continuation of application No. 15/615,365, filed on Jun. 6, 2017, now Pat. No. 11,392,902.

(51) Int. Cl.
*G06Q 10/10* (2023.01)
*G06Q 10/1093* (2023.01)
(Continued)

(52) U.S. Cl.
CPC ..... *G06Q 10/1097* (2013.01); *G06Q 10/0834* (2013.01); *G06Q 10/08355* (2013.01)

(58) Field of Classification Search
None
See application file for complete search history.

(56) References Cited

U.S. PATENT DOCUMENTS 3,757,917 A    9/1973    Waiwood et al.
5,774,053 A    6/1998    Porter
(Continued)

OTHER PUBLICATIONS

Z. Li, H. Wu, B. King, Z. Ben Miled, J. Wassick and J. Tazelaar, "On the Integration of Event-Based and Transaction-Based Architectures for Supply Chains," 2017 IEEE 37th International Conference on Distributed Computing Systems Workshops (ICDCSW), 2017, pp. 376-382, doi: 10.1109/ICDCSW.2017.51. (Year: 2017).*
(Continued)

*Primary Examiner* — Cory W Eskridge
(74) *Attorney, Agent, or Firm* — Shook, Hardy & Bacon L.L.P.

(57) ABSTRACT

An apparatus is provided for providing notification of items for pickup at a location. The apparatus may include at least one memory and a processor(s) configured to automatically send an electronic message to a network device requesting pickup of an item(s) at a location of a user of the apparatus responsive to detecting pressing of a button on an exterior of the apparatus. The processor is also configured to receive an acknowledgement message from the network device denoting (i) confirmation that the network device received the electronic message requesting pickup of the item(s) at the location of the user and (ii) scheduled pickup of the item(s) from the location of the user at an estimated time. The processor is further configured to generate a visible indication regarding the pickup of the item(s) in response to detecting receipt of the acknowledgement message. Corresponding computer program products and methods are also provided.

20 Claims, 6 Drawing Sheets

(51) Int. Cl.
  *G06Q 10/0835* (2023.01)
  *G06Q 10/0834* (2023.01)

(56) References Cited

U.S. PATENT DOCUMENTS

| | | | |
|---|---|---|---|
| 5,818,336 | A | 10/1998 | Varga et al. |
| 7,752,210 | B2 | 7/2010 | Riise et al. |
| 7,885,821 | B2 | 2/2011 | Tait |
| 2002/0013744 | A1* | 1/2002 | Tsunenari .......... G06Q 30/0601 705/28 |
| 2003/0065571 | A1 | 4/2003 | Dutta |
| 2004/0073490 | A1* | 4/2004 | Shah .................. G06Q 10/08 705/26.1 |
| 2004/0243430 | A1* | 12/2004 | Horstemeyer ........ B60R 25/102 340/928 |
| 2005/0038758 | A1* | 2/2005 | Hilbush ............ G06Q 10/0835 705/402 |
| 2005/0154602 | A1* | 7/2005 | Hertz ..................... A47G 29/30 705/339 |
| 2015/0242810 | A1 | 8/2015 | Rifai |
| 2017/0313421 | A1 | 11/2017 | Gil |
| 2018/0349861 | A1 | 12/2018 | Goja |

OTHER PUBLICATIONS

M. Saleem, S. Poslad and W. Asif, "Internet of Things: Smart Ubiquitous Architecture of Intelligent Transport System," 2018 2nd European Conference on Electrical Engineering and Computer Science (EECS), 2018, pp. 88-99, doi: 10.1109/EECS.2018.00026. (Year: 2018).*

Amazon Dash Button, Available Online at <https://www.amazon.com/Dash-Buttons/b?ie=UTF8&node=10667898011>, Dec. 23, 2016, pp. 1-8.

* cited by examiner

SYSTEMS, METHODS, APPARATUSES AND COMPUTER PROGRAM PRODUCTS FOR PROVIDING NOTIFICATION OF ITEMS FOR PICKUP AND DELIVERY

CROSS-REFERENCE TO RELATED APPLICATIONS

This application is a continuation application of and claims priority to and the benefit of U.S. application Ser. No. 15/615,365 filed Jun. 6, 2017, the entire contents of each of the foregoing applications being hereby incorporated by reference herein.

TECHNOLOGICAL FIELD

An embodiment of the invention relates generally to a system, method, apparatus, and computer program product for notifying a shipping carrier of one or more items for pickup at a location.

BACKGROUND

Presently, to facilitate pickup of parcels from a customer location, a customer may typically call a service center of a shipping carrier to schedule and arrange for pickup of a parcel(s) or the customer may physically visit a service center of the shipping carrier to schedule and arrange for pickup of a parcel(s) at a customer location. Alternatively, at present, a customer may typically utilize a mobile phone, computer, tablet or the like to connect to a network such as the Internet to access a webpage of the shipping carrier so that the customer may input information (e.g., name, address, type of shipment, etc.) into the webpage to request pickup of a parcel(s) at a customer location.

These current approaches typically require the customer to perform various active steps (e.g., calling a service center, visiting a service center, using an electronic device to access a webpage, etc.) for the customer to arrange for pickup up a parcel(s), which may be inefficient, time consuming and burdensome to customers.

As such, a need may exist for a more efficient and less cumbersome approach to facilitate scheduling of pickup of parcels at a customer location.

BRIEF SUMMARY

The present invention provides systems, methods, apparatuses and computer program products for providing notification of one or more items for pickup at a location. In this regard, a communication device (e.g., an Internet of Things (IoT) communication device) of the exemplary embodiments may detect a selection/pressing of a push button, which may trigger sending of a message/signal, by the communication device, to a network device to arrange for pickup of an item(s) at a location (e.g., an address, a GPS location, etc.) of a user of the communication device. In response, the communication device may receive an acknowledgement from the network device that the pickup of the item(s) at the location of the user is scheduled.

In some exemplary embodiments, the acknowledgement may be a signal sent to the communication device which may trigger a light of the push button to flash/blink denoting to the user of the communication device that the network device scheduled pickup of the item(s) at the location. In some other exemplary embodiments, the acknowledgement may be a message (also referred to herein as an acknowledgement message) received, by the communication device, from the network device confirming that the network device scheduled, and arranged resources (e.g., a assigned driver and delivery vehicle), for pickup of the item(s) at the location of the user. The acknowledgement message may also specify an estimated time for pickup of the item(s) at the location of the user. Furthermore, upon receipt of the acknowledgement message from the network device, a display device of the communication device may display the visible indicia (e.g., confirmation that pickup of the item(s) at the location is scheduled and an estimated time for the pickup) of the acknowledgement message to the user of the communication device. In one example embodiment, the display device may have a small monochromatic organic light-emitting diode (OLED) display screen. In other example embodiments, the display device may include any other suitable display screen configured to display the visible indicia.

The network device of the exemplary embodiments may also provide an electronic message to the display device of the communication device (e.g., an IoT communication device) of the user notifying the user if a scheduled pickup of one or more items, at a location of the user, is delayed or cancelled.

Moreover, by utilizing a push button (e.g., in response to a depression/selection of the push button) of a communication device (e.g., an IoT communication device) to trigger automatic sending of a signal(s)/message(s) to a network device requesting pickup of one or more items at a location of a user, the exemplary embodiments may conserve computing resources and bandwidth of the communication device by not requiring other components (e.g., a user interface for input of data of the signal(s)/message(s), a display device for viewing of input data, etc.) to perform multiple tasks for generating the signal(s)/message(s).

In one example embodiment, a method for providing notification of one or more items for pickup at a location is provided. The method may include automatically sending a generated electronic message to a network device requesting pickup of one or more items at a location of a user of a communication device in response to detecting pressing of a button on an exterior of the communication device. The method may further include receiving an electronic acknowledgement message from the network device denoting (i) confirmation that the network device received the generated electronic message requesting pickup of the one or more items at the location of the user and (ii) scheduled pickup of the one or more items from the location of the user at an estimated time. The method may further include generating a visible indication regarding the pickup of the one or more items in response to detecting receipt of the electronic acknowledgement message.

In another example embodiment, an apparatus for providing notification of one or more items for pickup at a location is provided. The apparatus may include a processor and a memory including computer program code. The memory and computer program code are configured to, with the at least one processor, cause the apparatus to at least perform operations including automatically sending a generated electronic message to a network device requesting pickup of one or more items at a location of a user of the apparatus in response to detecting pressing of a button on an exterior of the apparatus. The memory and computer program code are also configured to, with the processor, cause the apparatus to receive an electronic acknowledgement message from the network device denoting (i) confirmation that the network device received the generated electronic message requesting pickup of the one or more items at the location of the user and (ii) scheduled pickup of the one or more items from the location of the user at an estimated time. The memory and computer program code are also configured to, with the processor, cause the apparatus to generate a visible indication regarding the pickup of the one or more items in response to detecting receipt of the electronic acknowledgement message.

In yet another example embodiment, a computer program product for providing notification of one or more items for pickup at a location is provided. The computer program product includes at least one computer-readable storage medium having computer-executable program code instructions stored therein. The computer-executable program code instructions may include program code instructions configured to automatically send a generated electronic message to a network device requesting pickup of one or more items at a location of a user of an apparatus in response to detecting pressing of a button on an exterior of the apparatus. The computer program product may further include program code instructions configured to cause receipt of an electronic acknowledgement message from the network device denoting (i) confirmation that the network device received the generated electronic message requesting pickup of the one or more items at the location of the user and (ii) scheduled pickup of the one or more items from the location of the user at an estimated time. The computer program product may further include program code instructions configured to generate a visible indication regarding the pickup of the one or more items in response to detecting receipt of the electronic acknowledgement message.

BRIEF DESCRIPTION OF THE SEVERAL VIEWS OF THE DRAWINGS

Figure 1:
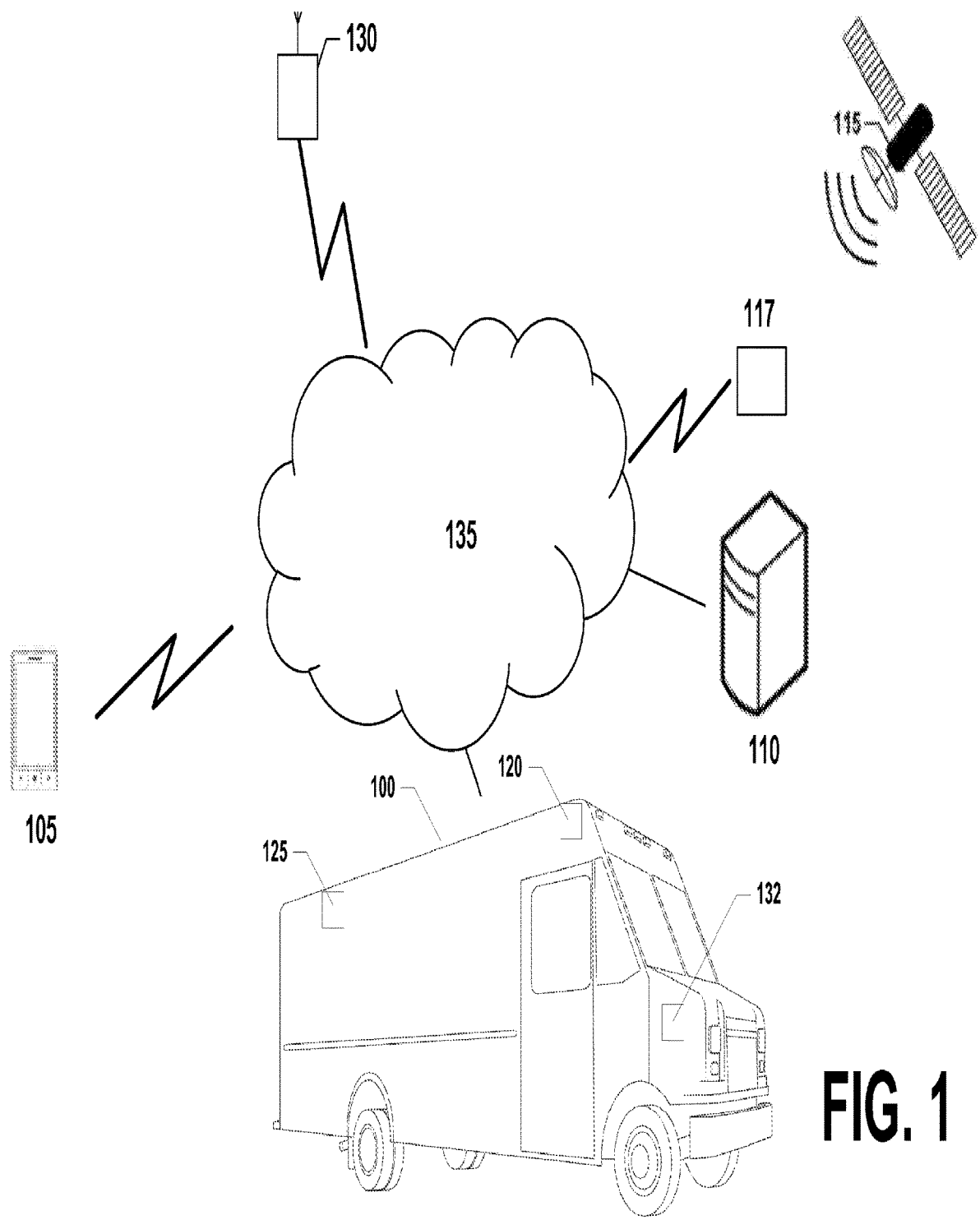

Having thus described the invention in general terms, reference will now be made to the accompanying drawings, which are not necessarily drawn to scale, and wherein:

FIG. 1 is a diagram of a system that can be used to practice various embodiments of the present invention.

Figure 2:
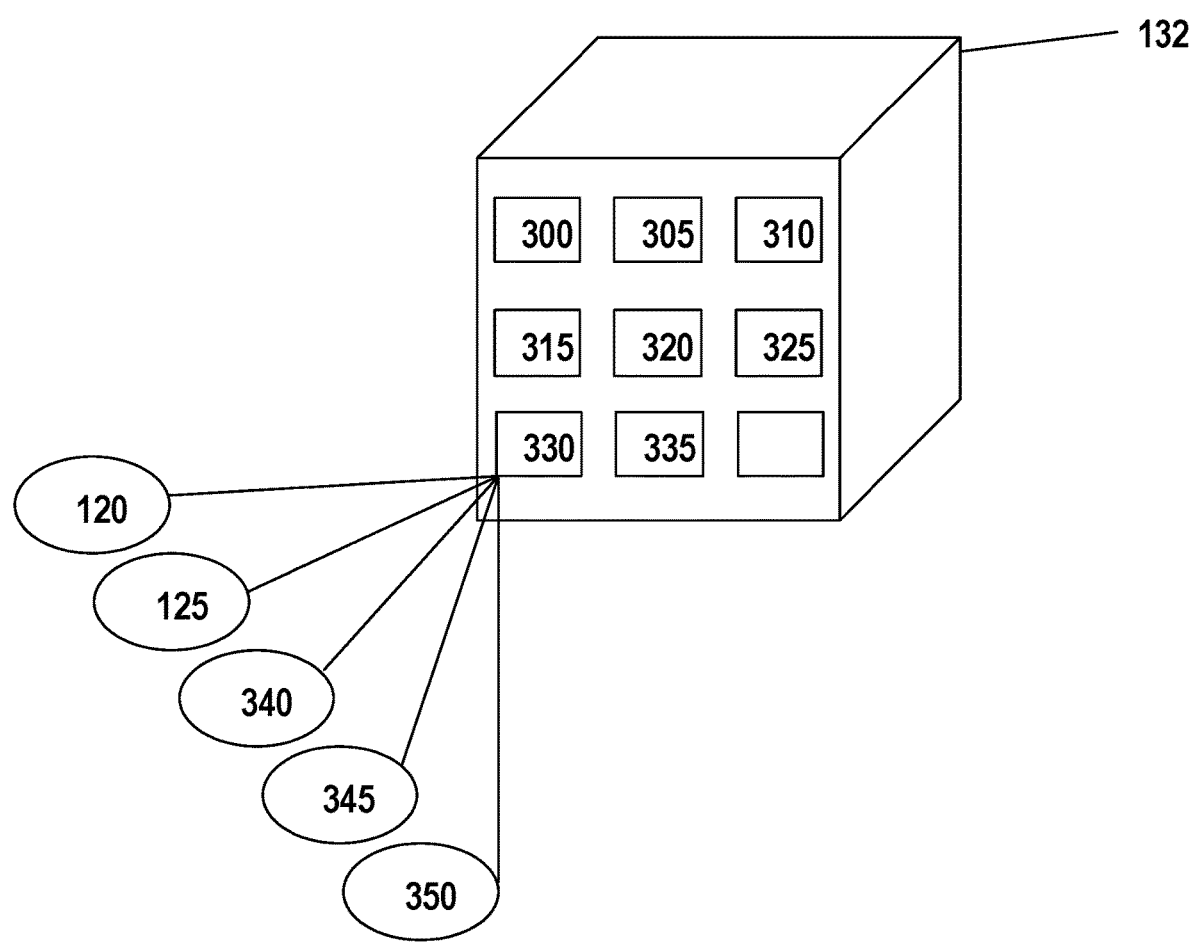

FIG. 2 is a diagram of an information/data collection device that may be used in association with certain embodiments of the present invention.

Figure 3:
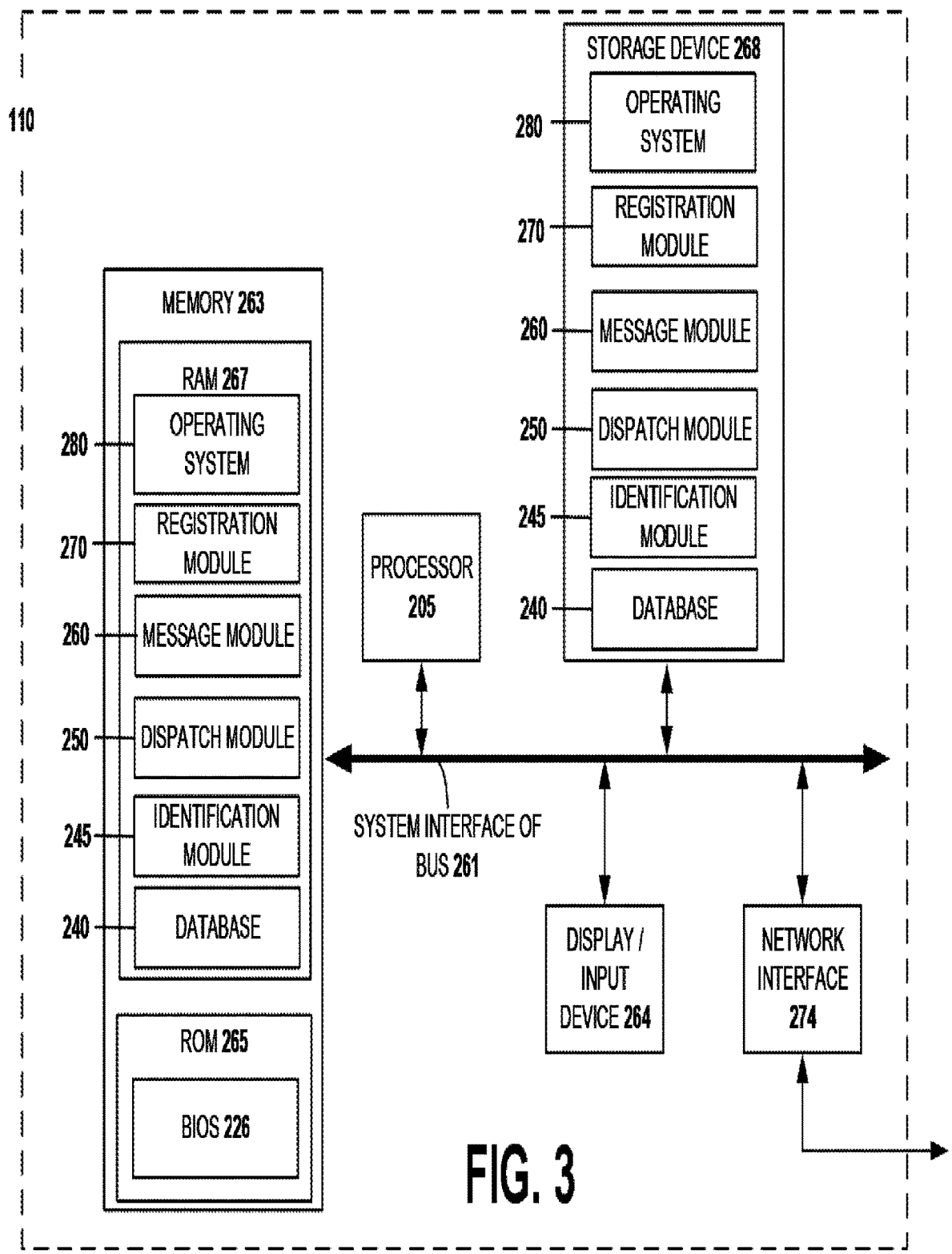

FIG. 3 is a schematic of a management computing entity in accordance with certain embodiments of the present invention.

Figure 4:
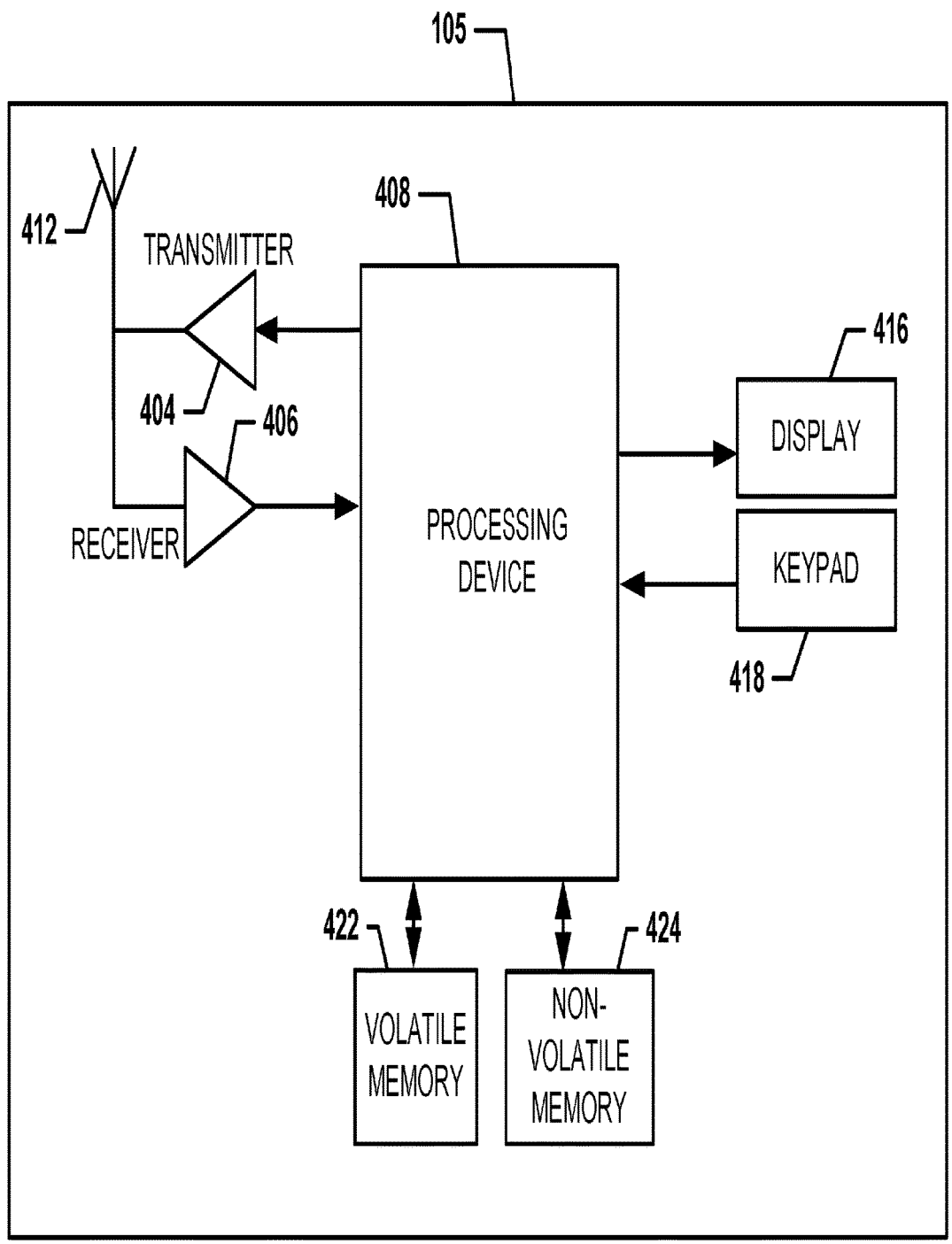

FIG. 4 is a schematic of a mobile computing entity in accordance with certain embodiments of the present invention.

Figure 5:
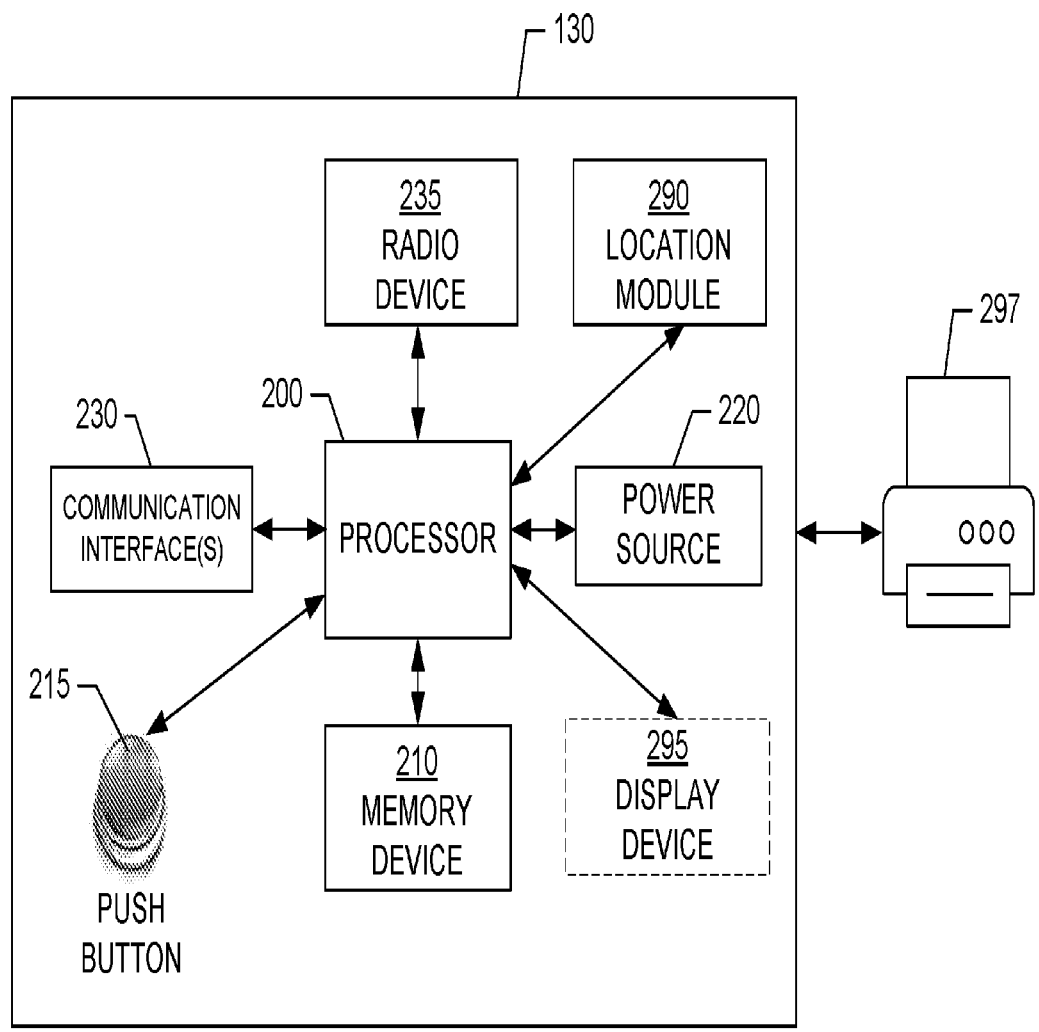

FIG. 5 is a diagram of an IoT computing entity that may be used in association with certain embodiments of the present invention.

Figure 6:
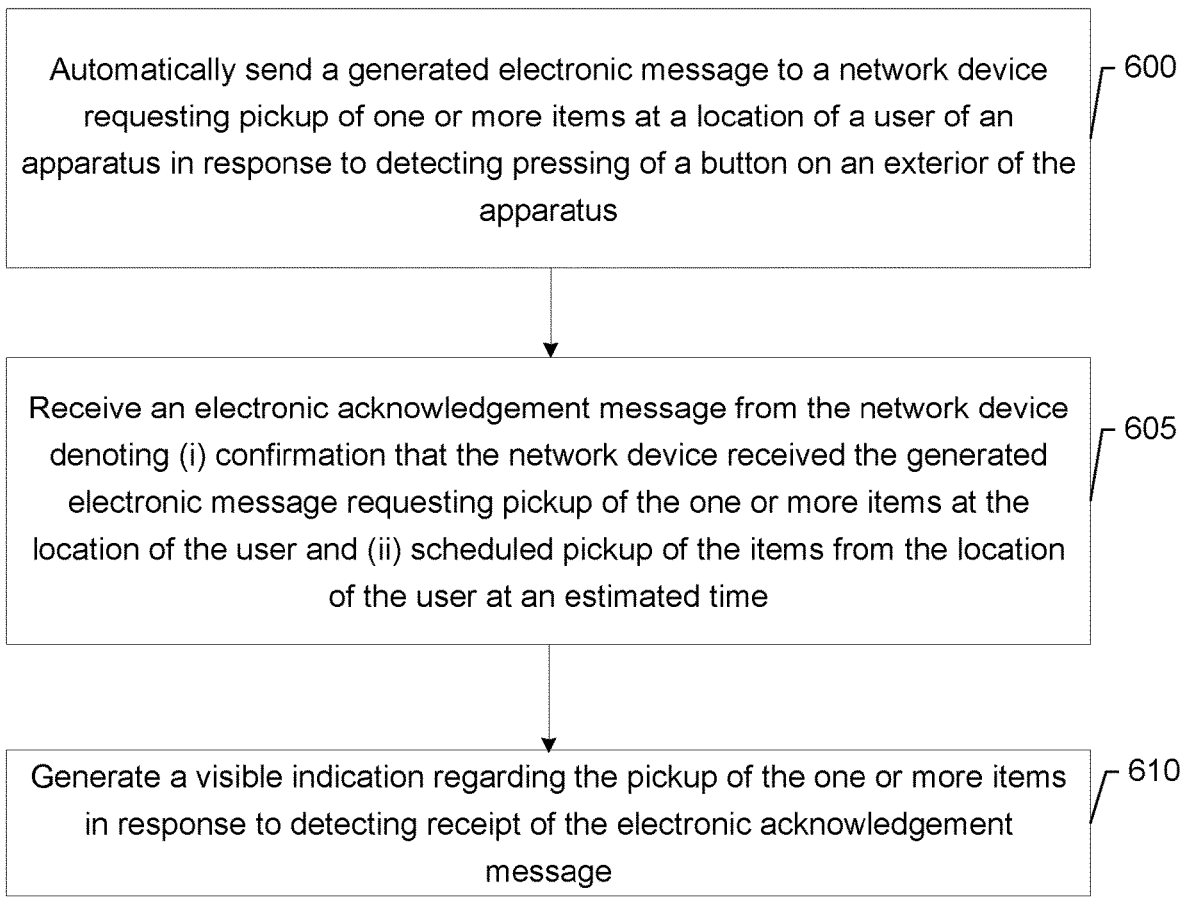

FIG. 6 is a flowchart illustrating operations and processes that can be used in accordance with various embodiments of the present invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. METHODS, APPARATUSES, SYSTEMS, AND COMPUTER PROGRAM PRODUCTS

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MIVIC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of a system that can be used in conjunction with various embodiments of the present invention. As shown in FIG. 1, the system may include one or more vehicles (e.g., delivery vehicles 100) one or more Internet of Things (IoT) computing entities 130, one or more mobile computing entities 105, one or more management computing entities 110, one or more user computing entities 117, one or more Global Positioning System (GPS) satellites 115, one or more location sensors 120, one or more information/data collection devices 130, one or more telematics sensors 125, one or more networks 135, and/or the like. Each of the components of the system may be in electronic communication with, for example, one another over the same or different wireless or wired networks including, for example, a wireless cellular network, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

1. Exemplary Delivery Vehicle

As discussed herein, a delivery vehicle 100 may be a human operable delivery vehicle configured for transporting a vehicle operator and a plurality of items along a delivery route. For example, a vehicle 100 may be a manned or an unmanned tractor, truck, car, motorcycle, moped, Segway, bicycle, golf cart, hand truck, cart, trailer, tractor and trailer combination, van, flatbed truck, vehicle, drone, airplane, helicopter, boat, barge, and/or any other form of object for moving or transporting people, UAVs, and/or shipments/items (e.g., one or more packages, parcels, bags, containers, loads, crates, items banded together, vehicle parts, pallets, drums, the like, and/or similar words used herein interchangeably). In one embodiment, each vehicle 100 may be associated with a unique vehicle identifier (such as a vehicle ID) that uniquely identifies the vehicle 100. The unique vehicle ID (e.g., trailer ID, tractor ID, vehicle ID, and/or the like) may include characters, such as numbers, letters, symbols, and/or the like. For example, an alphanumeric vehicle ID (e.g., "AS445") may be associated with each vehicle 100. In another embodiment, the unique vehicle ID may be the license plate, registration number, or other identifying information/data assigned to the vehicle 100. In various embodiments, the delivery vehicle 100 may be configured as discussed in co-pending U.S. patent application Ser. No. 15/582,129, filed Apr. 28, 2017, and incorporated herein by reference in its entirety. Moreover, although not shown, the interior of the delivery vehicle 100 may comprise a cargo area configured for storing a plurality of items and/or the like.

Furthermore, the delivery vehicle 100 may comprise and/or be associated with one or more computing entities, devices, and/or similar words used herein interchangeably. For example, the delivery vehicle 100 may be associated with an information/data collection device 132 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

FIG. 2 provides a block diagram of an exemplary information/data collection device 132 that may be attached, affixed, disposed upon, integrated into, or part of a vehicle 100. The information/data collection device 132 may collect telematics information/data (including location data) and transmit/send the information/data to the mobile computing entity 105, the management computing entity 110, and/or various other computing entities via one of several communication methods.

In one embodiment, the information/data collection device 132 may include, be associated with, or be in wired or wireless communication with one or more processors 300 (various exemplary processors are described in greater detail below), one or more location-determining devices or one or more location sensors 120 (e.g., Global Navigation Satellite System (GNSS) sensors), one or more telematics sensors 125, one or more real-time clocks 315, a J-Bus protocol architecture, one or more electronic control modules (ECM) 345, one or more communication ports 330 for receiving telematics information/data from various sensors (e.g., via a CAN-bus), one or more communication ports 305 for transmitting/sending data, one or more RFID tags/sensors 350, one or more power sources 320, one or more information/data radios 335 for communication with a variety of communication networks, one or more memory modules 310, and one or more programmable logic controllers (PLC) 325. It should be noted that many of these components may be located in the vehicle 100 but external to the information/data collection device 132.

In one embodiment, the one or more location sensors 120, modules, or similar words used herein interchangeably may be one of several components in wired or wireless communication with or available to the information/data collection device 132. Moreover, the one or more location sensors 120 may be compatible with GPS satellites 115, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 100 and/or its operator. The one or more location sensors 120 may be used to receive latitude, longitude, altitude, heading or direction, geocode, course, position, time, and/or speed information/data (e.g., referred to herein as telematics information/data and further described herein below). The one or more location sensors 120 may also communicate with the management computing entity 110, the information/data collection device 132, mobile computing entity 105, the user computing entity 117 and/or similar computing entities.

As indicated, in addition to the one or more location sensors 120, the information/data collection device 132 may include and/or be associated with one or more telematics sensors 125, modules, and/or similar words used herein interchangeably. For example, the telematics sensors 125 may include vehicle sensors, such as engine, fuel, odometer, hubometer, tire pressure, location, weight, emissions, door, and speed sensors. The telematics information/data may include, but is not limited to, speed data, emissions data, RPM data, tire pressure data, oil pressure data, seat belt usage data, distance data, fuel data, idle data, and/or the like (e.g., referred to herein as telematics data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone (03), hydrogen sulfide (H2S) and/or ammonium (NH4) data, and/or meteorological information/data (e.g., referred to herein as telematics data).

In one embodiment, the ECM 345 may be one of several components in communication with and/or available to the information/data collection device 132. The ECM 345, which may be a scalable and subservient device to the information/data collection device 132, may have information/data processing capability to decode and store analog and digital inputs from vehicle systems and sensors. The ECM 345 may further have information/data processing capability to collect and present telematics information/data to the J-Bus (which may allow transmission to the information/data collection device 132), and output standard vehicle diagnostic codes when received from a vehicle's J-Bus-compatible on-board controllers 340 and/or sensors.

As indicated, a communication port 330 may be one of several components available in the information/data collection device 132 (or be in or as a separate computing entity). Embodiments of the communication port 330 may include an Infrared information/data Association (IrDA) communication port, an information/data radio, and/or a serial port. The communication port 330 may receive instructions for the information/data collection device 132. These instructions may be specific to the vehicle 100 in which the information/data collection device 132 is installed, specific to the geographic area in which the vehicle 100 will be traveling, specific to the function the vehicle 100 serves within a fleet, and/or the like. In one embodiment, the information/data radio 335 may be configured to communicate with a wireless wide area network (WWAN), wireless local area network (WLAN), wireless personal area network (WPAN), or any combination thereof. For example, the information/data radio 335 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra-wideband (UWB), infrared (IR) protocols, Bluetooth protocols (including Bluetooth low energy (BLE)), wireless universal serial bus (USB) protocols, and/or any other wireless protocol.

2. Exemplary Management Computing Entity

FIG. 3 provides a schematic of a management computing entity 110 according to one embodiment of the present invention. The management computing entity can be operated by a variety of entities, including a carrier. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Coyote, Amazon, Google, Uber, ride-sharing services, crowd-sourcing services, retailers, and/or the like.

In general, the terms computing entity, entity, device, system and/or similar words used herein interchangeably may refer to, for example, one or more computers, computing entities, computing devices, mobile phones, gaming consoles (e.g., Xbox, Play Station, Wii), desktops, tablets, notebooks, laptops, distributed systems, servers or server networks, blades, gateways, switches, processing devices, processing entities, set-top boxes, relays, routers, network access points, base stations, the like, and/or any combination of devices or entities adapted to perform the functions, operations, and/or processes described herein. However, the management computing entity 110 may also comprise various other systems, such as an Address Matching System (AMS), an Internet Membership System (IMS), a Customer Profile System (CPS), a Package Center Information System (PCIS), a Customized Pickup and Delivery System (CPAD), a Web Content Management System (WCMS), a Notification Email System (NES), a Fraud Prevention System (FPS), and a variety of other systems and their corresponding components. The management computing entity 110 may also be in communication with various payment networks/systems for carrying out or facilitating the payment of fees. As will be recognized, the payment of such fees may be in a variety of forms, such as via debit cards, credit cards, direct credits, direct debits, cash, check, money order, Internet banking, e-commerce payment networks/systems (e.g., PayPal™ Google Wallet, Amazon Payments), virtual currencies (e.g., Bitcoins), award or reward points, and/or the like.

As will be understood from FIG. 3, in one embodiment, the management computing entity 110 includes one or more processors 205 that communicate with other elements within the management computing entity 110 via a system interface or bus 261. The processor 205 may be embodied in a number of different ways. For example, the processor 205 may be embodied as a processing element, processing circuitry, a coprocessor, a controller or various other processing devices including integrated circuits such as, for example, an application specific integrated circuit (ASIC), a field programmable gate array (FPGA), a hardware accelerator, or the like.

In an exemplary embodiment, the processor 205 may be configured to execute instructions stored in memory or otherwise accessible to the processor 205. As such, whether configured by hardware or software methods, or by a combination thereof, the processor 205 may represent an entity capable of performing operations according to embodiments of the present invention when configured accordingly. A display device/input device 264 for receiving and displaying data may also be included in the management computing entity 110. This display device/input device 264 may be, for example, a keyboard or pointing device that is used in combination with a monitor. The management computing entity 110 may further include transitory and non-transitory memory 263, which may include both random access memory (RAM) 267 and read only memory (ROM) 265. The ROM 265 of the management computing entity 110 may be used to store a basic input/output system (BIOS) 226 containing the basic routines that help to transfer information to the different elements within the management computing entity 110.

In addition, in one embodiment, the management computing entity 110 may include at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards (M1VICs), secure digital (SD) memory cards, Memory Sticks, electrically erasable programmable read-only memory (EEPROM), flash memory, hard disk, or the like. Additionally, each of these storage devices 268 may be connected to the system bus 261 by an appropriate interface.

Furthermore, a number of executable instructions, applications, program modules, and/or the like may be stored by the various storage devices 268 and/or within RAM 267. Such executable instructions, applications, program modules, and/or the like may include an operating system 280, a registration module 270, a message module 260, a dispatch module 250, an identification module 245, and/or the like.

As discussed in more detail below, these executable instructions, applications, program modules, and/or the like may control certain aspects of the operation of the management computing entity 110 with the assistance of the processor 205 and operating system 280—although their functionality need not be modularized. In addition to the program modules, the management computing entity 110 may store or be in communication with one or more databases, such as database 240.

In an exemplary embodiment, the processor 205 may be in communication with and may otherwise control the dispatch module 250. The dispatch module 250 may operate in accordance with software embodied in memory (e.g., memory 263, storage device 268) to perform the corresponding functions of the dispatch module 250, as described below. In examples in which software is employed, a device or circuitry (e.g., processor 205 in one example) executing the software forms the structure associated with such means. As such, for example, in some example embodiments, the dispatch module 250 may be configured to, among other things, facilitate generation of one or more messages (e.g., an acknowledgement message) confirming receipt of a request for pickup of one or more items at a location of a user and arranging/scheduling (e.g., scheduling an estimated time for pickup, assigning a dispatch driver and a delivery vehicle, etc.) for pickup of the items at the location and for delivery of the items to a destination address, as described more fully below.

Also located within the management computing entity 110, in one embodiment, is a network interface 274 for interfacing with various computing entities (e.g., with one or more mobile computing entities 105, IoT computing entities 130, user computing entities 117). For example, the management computing entity 110 may be able to receive data and/or messages from and transmit data and/or messages to the mobile computing entity 105, IoT computing entity 130, and user computing entity 117. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 110 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra-wideband (UWB), infrared (IR) protocols, Bluetooth' protocols, wireless universal serial bus (USB) protocols, and/or any other wireless protocol.

It will be appreciated that one or more of the components of the management computing entity 110 may be located remotely from other management computing entity 110 components. Furthermore, one or more of the components may be combined and additional components performing functions described herein may be included in the management computing entity 110.

3. Exemplary Mobile Computing Entity

FIG. 4 provides an illustrative schematic representative of a mobile computing entity 105 that can be used in conjunction with embodiments of the present invention. In one embodiment, a mobile computing entity (e.g., a Delivery Information Acquisition Device (DIAD)) may be carried for use by carrier personnel. In one embodiment, the mobile computing entities 105 may include one or more components that are functionally similar to those of the management computing entity 110 and/or as described below. As will be recognized, mobile computing entities 105 can be operated by various parties, including personnel collecting, delivering, transporting items, maintenance personnel, and dispatchers. As shown in FIG. 4, a mobile computing entity 105 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as IoT computing entities 130, management computing entities 110, and/or the like. In this regard, the mobile computing entity 105 may be capable of operating with one or more air interface standards, communication protocols, modulation types, and access types. More particularly, the mobile computing entity 105 may operate in accordance with any of a number of wireless communication standards and protocols. In a particular embodiment, the mobile computing entity 105 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile computing entity 105 can communicate with various other entities using concepts such as Unstructured Supplementary Service information/data (US SD), Short Message Service (SMS), Multimedia Messaging Service (MMS), Dual-Tone Multi-Frequency Signaling (DTMF), and/or Subscriber Identity Module Dialer (SIM dialer). The mobile computing entity 105 can also download changes, add-ons, and updates, for instance, to its firmware, software (e.g., including executable instructions, applications, program modules), and operating system.

According to one embodiment, the mobile computing entity 105 may include location determining aspects, devices, modules, functionalities, and/or similar words used herein interchangeably. For example, the mobile computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, GLONASS, the Chinese Compass navigation systems, Indian Regional Navigational satellite systems, and/or the like. Additionally, the location module may be compatible with A-GPS (Assisted GPS) for quick time to first fix and jump starting the ability of the location module to acquire location almanac and ephemeris data, and/or be compatible with SBAS such as WAAS, EGNOS, MSAS, and/or GAGN to increase GPS accuracy. Alternatively, the location information/data may be determined by triangulating the mobile computing entity's 105 position in connection with a variety of other systems, including cellular towers, Wi-Fi access points, and/or the like. Similarly, the mobile computing entity 105 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE receivers and/or transmitters, NFC receivers and/or transmitters, and/or the like. These indoor positioning aspects can be used in a variety of settings to determine the location of someone or something to within inches or centimeters.

The mobile computing entity 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile computing entity 105 to interact with and/or cause display of information. The user input interface can comprise any of a number of devices allowing the mobile computing entity 105 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the mobile computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing entity can collect contextual information/data as part of the management data.

The mobile computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the mobile computing entity 105.

4. IoT Computing Entity

FIG. 5 shows an exemplary embodiment of an IoT computing entity 130. In one embodiment, the IoT computing entity 130 may include, be associated with, or be in wireless communication, or wired, with one or more processors 200 (various exemplary processors are described in greater detail below), one or more push buttons 215 (also referred to herein as button 215), one or more communication interfaces 230 for receiving/transmitting information/data from/to various sources (e.g., management computing entities 110, mobile computing entities 105, etc.), one or more power sources 220, one or more information/data radios 235 (also referred to herein as radio device 235) for communication with a variety of communication networks, and one or more memory devices 210. In some example embodiments, the IoT computing entity 130 may also optionally include a display device 295. The display device 295 may be a light-emitting diode (LED) display, an organic light-emitting diode (OLED) display or any other suitable display.

Each IoT computing entity 130 may be powered by one or more power sources 220. The power source may be a source provided by a power outlet, an energy storage device (e.g., a battery (e.g., a LiFePO4 battery, etc.), a supercapacitor, and/or the like), a Universal Serial Bus (USB) power charger and/or the like.

In one example embodiment, each IoT computing entity 130 may communicate with communication devices such as, for example, management computing entities 110, mobile computing entities 105, user computing entities 117, printer 297 and the like using a wireless communication standard such as, for example Wi-Fi, cellular, Long Range (LoRa) or the like. In some other exemplary embodiments, each IoT computing entity 130 may communicate with communication devices (e.g., management computing entity 110, mobile computing entity 105, user computing entities 117, printer 297, etc.) using wireless communication standards and protocols, including Bluetooth, Wibree, NFC, Wi-Fi, ZigBee, general packet radio service (GPRS), and/or any other wireless protocol or standard. The IoT computing entity 130 may also be in direct or indirect communication with the management computing entity 110, the mobile computing entity 105, and/or similar computing entities over the same or different wired or wireless networks.

In another embodiment, an IoT computing entity 130 may be operated in one or more operating modes, such as a monitoring mode, a sleep mode, and/or the like. In the monitoring mode, the IoT computing entity 130 may be in a full power mode or a power mode greater than a low power mode (e.g., a sleep mode) and may actively monitor for communications (e.g., receipt of communications from other computing entities (e.g., management computing entity 110, mobile computing entity 105, etc.) and may execute instructions. The IoT computing entity 130 may also transmit a signal(s) during the monitoring mode. Furthermore, the IoT computing entity 130 may operate in the monitoring mode for a predetermined time period prior to entering a sleep mode.

For example, in an instance in which there are not any communications transmitted to or received by the IoT computing entity 130 during the predetermined time period of the monitoring mode, the IoT computing entity 130 may enter a sleep mode upon expiration of the predetermined time period. In sleep mode, the IoT computing entity 130 may remove power to unneeded subsystems and may place other subsystems (e.g., a processor (e.g., processor 200), a display (e.g., display device 295), etc.) into a configurable low power state (e.g., with just sufficient power for the IoT computing entity 130 to detect triggers/events for the IoT computing entity 130 to change/switch from sleep mode into other operational modes (e.g., monitoring mode)). The change of the operational mode may be triggered by various configurable triggers/events, such as, for example, detection of a selection/pressing of a button (e.g., button 215) which may cause transmission of a signal/message, as well as a message/signal received from a management computing entity 110, a mobile computing entity 105, a user computing entity 117 and/or other appropriate computing entities, combinations thereof, and/or the like. By utilizing the sleep mode, the IoT computing entity 130 may be able to conserve energy and reduce consumption of a battery of a power source (e.g., power source 220).

As indicated, a communication interface(s) 230 may be one of several components available in the IoT computing entity 130. Embodiments of the communication interface(s) 230 may include an Infrared information/data Association (IrDA) communication port, an information/data radio, and/or a serial port. In an exemplary embodiment, the communication interface(s) 230 may receive instructions for the IoT computing entity 130. In one exemplary embodiment, the IoT computing entity 130 may communicate using a Message Queue Telemetry Transport (MATT) protocol or any other suitable protocol. Further, in one exemplary embodiment, the information/data radio 235 may be configured to communicate with a network via Wi-Fi (e.g., IEEE 802.11), Wi-Fi Direct and/or the like. In some other exemplary embodiments, the information/data radio 235 may be configured to communicate with wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols (including Bluetooth Low Energy (BLE)), wireless universal serial bus (USB) protocols, and/or any other wireless protocol such as, for example, LoRa.

According to one embodiment, the IoT computing entity 130 may include location determining aspects, devices, modules, functionalities, and/or similar words used herein interchangeably. For example, the IoT computing entity 130 may include outdoor positioning aspects, such as a location module 290 adapted to acquire, for example, latitude, longitude, altitude, geocode, course, direction, heading, speed, UTC, date, and/or various other information/data. In one embodiment, the location module 290 may acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, GLONASS, the Chinese Compass navigation systems, Indian Regional Navigational satellite systems, and/or the like. Additionally, the location module 290 may be compatible with A-GPS for quick time to first fix and jump starting the ability of the location module 290 to acquire location almanac and ephemeris data, and/or be compatible with SBAS such as WAAS, EGNOS, MSAS, and/or GAGN to increase GPS accuracy. Alternatively, the location information/data may be determined by triangulating the position of the IoT computing entity 130 in connection with a variety of other systems, including cellular towers, Wi-Fi access points, and/or the like. Similarly, the IoT computing entity 130 may include indoor positioning aspects, such as a location module 290 adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For example, such technologies may include iBeacons, Gimbal proximity beacons, BLE receivers and/or transmitters, NFC receivers and/or transmitters, and/or the like. These indoor positioning aspects can be used in a variety of settings to determine the location of someone or something to within inches or centimeters.

As described more fully below, the IoT computing entity 130 may detect a selection/pressing of a push button 215, which may trigger sending of a message/signal, by the IoT computing entity 130, to the management computing entity 110 to arrange for pickup of an item(s) at a location (e.g., an address, a GPS location, etc.) of a user of the IoT computing entity 130. In response, the IoT computing entity 130 may receive an electronic acknowledgement from the management computing entity 110 that the pickup of the item(s) at the location of the user is scheduled.

In one exemplary embodiment, the acknowledgement may be a signal sent to the IoT computing entity 130 which causes a light of the push button 215 to flash/blink denoting to the user of the IoT computing entity 130 that the management computing entity 110 scheduled pickup of the item(s) at the location. In another exemplary embodiment, the acknowledgement may be a message received, by the IoT computing entity 130, from the management computing entity 110 confirming that the management computing entity 110 scheduled, and arranged resources (e.g., a dispatch driver and a vehicle), for pickup of the item(s) at the location of the user. The message may also specify an estimated time for pickup of the item(s) at the location of the user. Furthermore, upon receipt of the message from the management computing entity 110, the display device 295 of the IoT computing entity 130 may display (e.g., via an OLED display of the display device 295) the visible indicia (e.g., confirmation that pickup of the item(s) at the location is scheduled and an estimated time for pickup) of the message to the user of the IoT computing entity 130.

5. Exemplary User Computing Entity

In one embodiment, the user computing entities 117 may each include one or more components that are functionally similar to those of the management computing entity 110 and/or the mobile computing entity 105. For example, in one embodiment, each of the user computing entities 117 may include: (1) a processing element that communicates with other elements via a system interface or bus; (2) a user interface; (3) transitory and non-transitory memory; and (4) a communications interface. As previously noted, the computing entities 117 may comprise a user interface. For example, the user interface may be an application, browser, user interface, dashboard, webpage, and/or similar words used herein interchangeably executing on and/or accessible via the user computing entities 117 to interact with and/or cause display of information/data from the management computing entity 110, the mobile computing entity 105, and/or another appropriate computing entity, as described herein. The user input interface can comprise any of a number of devices allowing the user computing entities 117 to receive data, such as a keypad (hard or soft), a touch display, voice/speech or motion interfaces, scanners, readers, or other input device. In addition to providing input, the user input interface can be used, for example, to activate or deactivate certain functions, such as screen savers and/or sleep modes. These architectures are provided for exemplary purposes only and are not limiting to the various embodiments.

6. Exemplary Items

In one embodiment, an item(s) may be any tangible and/or physical object. In another embodiment, an item may be enclosed in one or more packages, envelopes, parcels, bags, goods, products, loads, crates, items banded together, drums, the like, and/or similar words used herein interchangeably.

III. EXEMPLARY SYSTEM OPERATION

Reference will now be made to exemplary embodiments of a system that automatically arranges (e.g., schedules) for pickup of an item(s) at a location of a user in response to receipt of a signal/message from an IoT computing device in an instance in which a push button of the IoT computing device is selected/depressed, as described more fully below.

OPERATION OF EXEMPLARY EMBODIMENTS

In one exemplary embodiment, a user of an IoT computing device 110 may utilize a user computing entity 117 to communicate with the registration module 270 of the management computing entity 110 in order to set up/register a profile with the management computing entity 110, which may be maintained by a shipping carrier. In some other exemplary embodiments, a private blockchain (e.g., a server, a distributed database server) may also be utilized to set up/register a profile (e.g., a user profile) with the management computing entity 110 and may authorize and authenticate the user. The registration module 270 of the management computing entity 110 may provide a webpage to the user computing entity 117 so that the user may utilize a user interface of the user computing entity 117 to register the profile with the management computing entity. The profile may include data associated with authentication credentials (e.g., username, password, etc.) and account information (e.g., customer account information (e.g., a credit card account, etc.)) of the user to cover costs associated with shipments of one or more items. The profile may also include one or more locations such as, for example, one or more addressees of the user at which to pickup one or more items for delivery by the shipping carrier and may indicate a destination address at which to deliver one or more items. The management computing entity 110 may store the profile in memory 263 or storage device 268.

In one exemplary embodiment, a user of an IoT computing entity 130 desiring to have one or more items picked up for delivery from a location of the user may press/select the button 215 on the IoT computing entity 130. In this regard, the processor 200 of the IoT computing entity 130 may detect the pressing/selecting of the button 215, which may automatically trigger the processor 200 to generate and send a signal(s) or message(s) to the management computing entity 110 (e.g., to the dispatch module 250 of the management computing entity 110) requesting pickup of one or more items at a location (e.g., an address location, a geolocation (e.g., a GPS location)) of the user. In some exemplary embodiments, the signal(s)/message(s) generated by the processor 200 of the IoT computing device 130 may include data indicating a geolocation (e.g., latitude and longitude coordinates) of the IoT computing entity 130. The geolocation of the IoT computing entity 130 may be determined by the location module 290 and may be provided to the processor 200 for inclusion in the signal(s)/message(s).

In response to the processor 205 of the management computing entity 130 receiving the signal(s) or message(s) from the IoT computing entity 130, the processor 205 of the management computing entity 110 may automatically generate an electronic acknowledgement that is sent/transmitted to the IoT computing entity 130. In one example embodiment, the acknowledgement may be a signal to trigger/cause a light of the button 215 of the IoT computing entity 130 to flash/blink (e.g., flash periodically). In another example embodiment, the acknowledgement may include data confirming the scheduling of pickup of one or more items at a location of the user and may include content specifying an estimated time for the pickup of the one or more items at the location of the user.

As such, in one example embodiment, in response to the processor 200 of the IoT computing entity 130 detecting the electronic acknowledgement, the processor 205 (or message module 260) may cause/trigger a light of the button 215 to flash/blink (e.g., flash periodically during a predetermined time period (e.g., 15 seconds, 20 seconds, etc.)). The flashing/blinking of the light of the button 215 denotes confirmation to the user of the IoT computing entity 130 that the management computing entity 110 is arranging pickup of one or more items at a location of the user in response to receipt of the signal(s)/message(s) from the processor 200 of the IoT computing entity 130 requesting pickup of one or more items at the location of the user.

In another example embodiment, in response to the processor 200 of the IoT computing entity 130 detecting the electronic acknowledgement, the processor 205 (or message module 260) may provide visible indicia to the display device 295 visibly indicating confirmation that the management computing entity 110 scheduled pickup of the one or more items at the location of the user of the IoT computing entity 130 and visibly indicating an estimated time for pickup of the one or more items at the location of the user. In addition, the electronic acknowledgement received by the processor 200 of the IoT computing entity 130 from the processor 205 (or message module 260) of the management computing entity 110 may automatically trigger the processor 200 to generate one or more electronic shipping labels for shipping and tracking of the one or more items. In this regard, the processor 200 of the IoT computing entity 130 may communicate with and instruct the printer 297 to print the one or more generated electronic shipping labels. In response to receipt of the instruction(s) from the processor 200 of the IoT computing entity 130, the printer 297 may print the one or more generated electronic shipping labels.

The management computing entity 110 may determine that the location of the user for pickup of the one or more items corresponds to an address of the user indicated in the data of the profile of the user in response to analyzing the profile stored in memory 263 or the storage device 268. In this regard, in an instance in which the location of the address(es) information denoted in the profile of the user is utilized by the management computing entity 110 as the location for pickup of the one or more items at the location of the user, the IoT computing entity 130 need not necessarily be present at the location. Alternatively or additionally, the management computing entity 110 may determine the location of the user for pickup of one or more items corresponds to the geolocation information (e.g., latitude and longitude coordinates) indicated in the signal(s)/electronic message(s) received from the processor 200 of the IoT computing entity 130. Moreover, in some exemplary embodiments, the profile of the user may specify whether to utilize the address(es) indicated in the profile or a geolocation indicated in the signal(s)/message(s) received from the processor 200 of the IoT computing entity 130 as the location for pickup of one or more items of the user.

The dispatch module 250 of the management computing entity 110 may determine an estimated time for pickup of the one or more items at the location of the user of the IoT computing entity 130 based in part on identifying the geographic area (e.g., determined from location data received from the information/data collection device 132 and/or telematics sensors 125, location sensors 120) associated with the location of the user and determining a particular travel route to the location of the user in the geographic area. The dispatch module 250 may also determine the estimated time for pickup of the one or more items at the location of the user by analyzing a trace history (e.g., historical data pertaining to a specified order in which to deliver/pickup items on a route to a location) or delivery history (e.g., past delivery history to the location or nearby locations, traffic congestion history in the geographic area) to the location or other locations nearby in the geographic area in order to estimate when an assigned driver of a vehicle (e.g., vehicle 100) may arrive at the location of the user for pickup of one or more items. For example, by evaluating the trace history or delivery history, the dispatch module 250 may determine an average time it takes for a vehicle (e.g., vehicle 100) to arrive at a location for pickup of one or more items. The determined average time may be used by the dispatch module 250 as the estimated time for pickup of one or more items at the location of the user of the IoT computing entity 130.

In some exemplary embodiments, the dispatch module 250 of the management computing entity 110 may be able to monitor vehicles in real-time and determine which vehicle(s), among a fleet of vehicles, is the closest (e.g., by receiving geo-coordinates from an information/data collection device 132 and/or telematics sensor 125, location sensor 120 of the vehicles) to the location of the user of the IoT computing entity 130 and may determine an estimated time for the determined closest vehicle to divert from its current travel route and arrive at the location of the user of the IoT computing entity 130, via another travel route, for pickup of one or more items.

In an exemplary embodiment, as a vehicle (e.g., vehicle 100) travels and enters a predetermined distance (e.g., 3 miles, 5 miles, etc.) from the location of the user of the IoT computing entity 130, the processing device 408 of a mobile computing entity 105, and/or the dispatch module 250 of the management computing entity 110, may send visible indicia to the display device 295 of the IoT computing entity 130 visually indicating that the vehicle is within the predetermined distance (e.g., 3 miles, 5 miles, etc.) from the location and within an estimated time for arriving at the location (e.g., within 10 minutes, 5 minutes, etc.).

In another example embodiment, in an instance in which the dispatch module 250 may determine that an assigned vehicle for arriving at the location is not on schedule to arrive (e.g., due to current traffic congestion in the geographic area detected by real-time GPS data of the information/data collection device 132 and/or telematics sensor 125, location sensor 120, etc.) at the location of the user at the initial estimated time of arrival, the dispatch module 250 may recalculate (e.g., based on the trace history, the delivery history and the current detected traffic congestion) an estimated time of arrival. In this regard, the dispatch module 250 may send visible indicia, indicating the recalculated estimated time of arrival to the display device 295 of the IoT computing entity 130 to visually display the recalculated estimated time of arrival at the location of the user of the IoT computing entity 130.

In an exemplary embodiment, upon arrival at the location of the user of the IoT computing entity 130, the driver of the vehicle (e.g., vehicle 100) may collect one or more printed electronic shipping label(s), printed by the printer 297, and one or more items for pickup and may include the one or more items in one or more corresponding packages. The driver may also affix the printed electronic shipping label(s) onto the one or more packages and may load the packages on the vehicle, which delivers the one or more packages, along a travel path determined by the dispatch module 250, to a destination address indicated in the profile of the user stored in the memory 263 or the storage device 268 of the management computing entity 110.

In one embodiment, each electronic shipping label(s) on each package(s) may include and/or be associated with a unique tracking identifier, such as an alphanumeric identifier. Such tracking identifiers may be represented as text, barcodes, tags, character strings, Aztec Codes, MaxiCodes, information/data Matrices, Quick Response (QR) Codes, electronic representations, and/or the like. A unique tracking identifier (e.g., 1Z123456789) may be used by the management computing entity 110 to identify and track packages as they move through a carrier's transportation network. For example, information/data comprising a tracking identifier can be read, scanned, transmitted, and/or the like, for example, by a mobile computing entity 105, to provide and/or identify/determine the location (e.g., geolocation) of a package in transit. Such tracking identifiers may be included on electronic shipping labels with the unique tracking identifier printed thereon (e.g., in human and/or machine readable form).

Furthermore, in some alternative exemplary embodiments, an IoT computing entity (e.g., IoT computing entity 130) may optionally include multiple (e.g., two, four, etc.) push buttons (e.g., push buttons 215) and each of the push buttons may be associated with or tied to respective different destination addresses in corresponding different profiles of the user stored in a memory (e.g., memory 263 or storage device 268) of the IoT computing entity (e.g., IoT computing entity 130). In this manner, by analyzing by the different profiles of the user stored on the memory of the management computing entity 110, the dispatch module 250 of the management computing entity 110 may schedule and arrange for pickup of different sets of one or more items at the location of the user of an IoT computing entity (e.g., IoT computing entity 130) for delivery to different destinations in response receipt of respective signals/messages from the IoT computing entity in an instance in which corresponding different push buttons are depressed/selected.

Furthermore, in some other alternative exemplary embodiments, an IoT computing entity (e.g., IoT computing entity 130) may have multiple different colored push buttons (e.g., push buttons 215) and each different colored push button(s) (e.g., push buttons 215) may be associated with a different type(s) of pickup service(s) (e.g., a next-day delivery service, a two-day delivery service, a ground delivery service, etc.) being requested by the IoT computing entity from the management computing entity 110.

Referring now to FIG. 6, an example embodiment of a flowchart for providing notification of one or more items for pickup at a location of a user is provided according to an example embodiment. At operation 600, an apparatus (e.g., IoT computing entity 130) may automatically send a generated electronic message to a network device (e.g., management computing entity 110) requesting pickup of one or more items at a location (e.g., an office, a home, a store, etc.) of a user of the apparatus in response to detecting pressing or selection of a button (e.g., button 215) on an exterior of the apparatus.

At operation 605, the apparatus (e.g., IoT computing entity 130) may receive an electronic acknowledgement message from the network device (e.g., management computing entity 110) denoting (i) confirmation that the network device received the generated electronic message requesting pickup of the one or more items at the location of the user and (ii) scheduled pickup of the items from the location of the user at an estimated time (e.g., at 4:00 PM).

At operation 610, the apparatus (e.g., IoT computing entity 130) may generate a visible indication (e.g., a blinking/flashing light of a button (e.g., button 215), data presented to a display device (e.g., display device 295) confirming receipt of the request for pickup of the one or more items) regarding the pickup of the one or more items in response to detecting receipt of the electronic acknowledgement message from the network device (e.g., management computing entity 110).

In one example embodiment, the apparatus (e.g., IoT computing entity 130) may generate the visible indication by causing a light of the button (e.g., button 215) to blink/flash periodically during a predetermined time period (e.g., 15 seconds, 20 seconds, etc.). In another exemplary embodiment, the apparatus (e.g., IoT computing entity 130) may generate the visible indication by presenting display of visible indicia, via a display device (e.g., display device 295) of the apparatus, indicating the confirmation that the network device (e.g., management computing entity 110) received the message requesting pickup of the items at the location and indicating the estimated time of the pickup of the one more items at the location.

It should be pointed out that FIG. 6 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed That which is claimed:

1. A method comprising:
    detecting a depression of a button, the button being on an exterior of an Internet of Things (IoT) device of a customer, the button corresponding to a pickup request, the IoT device not including any other buttons, the depression of the button being indicative of the customer requesting pickup of one or more items by one or more carrier entities at a current location of the customer, the IoT device including a location sensor configured to provide current geolocation coordinates of the IoT device in response to the depression of the push button;
    based on the depression of the button, automatically receiving, via the IOT device, an electronic message that includes the current geolocation coordinates and an indication of the customer request of the pickup;
    based at least in part on the current geolocation coordinates and the automatic receiving of the electronic message, receiving, via a processor, an electronic acknowledgement message from a network device, the acknowledgment message including a scheduled pickup of the one or more items from the current geolocation coordinates at an estimated time that the pickup will occur; and
    based at least in part on the receiving of the electronic acknowledgement message, causing generation, via the processor, of a visible indication on the IoT device that denotes to the customer, that the pickup of the one or more items has been scheduled to occur at the current geolocation coordinates.

2. The method of claim 1, wherein the causing generation of the visible indication comprises causing a light of the push button to blink periodically for a predetermined time period, the periodic blinking of the light denotes, to the customer, that the pickup of the one or more items has been scheduled to occur at the current geolocation coordinates.

3. The method of claim 1, wherein:
    the visible indication comprises visible indicia indicating the confirmation that the network device received the electronic message requesting the pickup of the one or more items at the location of the customer and indicating the estimated time of the pickup of the one more items at the geolocation coordinates of the customer.

4. The method of claim 1, wherein the network device is a management computing entity operated by a carrier.

5. The method of claim 1, wherein prior to the detecting of the pressing of the push button:
    receiving a customer profile that comprises indicia, specified by the customer, indicating at least one destination address that the one or more items will be delivered to after the pickup.

6. The method of claim 5, further comprising determining that another address in the customer profile corresponds to the current geolocation coordinates of the IoT device.

7. The method of claim 1, further comprising:
    automatically causing generation of an electronic shipping label for shipment of the one or more items to the particular destination address indicated in a customer profile stored on the network device.

8. The method of claim 7, wherein
    the electronic shipping label is automatically printed.

9. The method of claim 3, further comprising:
    determining that an assigned vehicle is unable to arrive at the current geolocation coordinates of the IoT device at the estimated time the pickup will occur for the one or more items; and
    generating a recalculated estimated time for pickup of the one or more items; and
    communicating the recalculated estimated time for pickup to the IoT device.

10. The method of claim 1, wherein the visible indication comprises
    visible data visibly indicating that the assigned vehicle is within a predetermined distance from the geolocation of the IoT device.

11. The method of claim 1 further comprising assigning the pickup of the one or more items to a vehicle, among a plurality of vehicles, that is closest to the geolocation of the IoT device.

12. An Internet of Things device (IoT) device comprising at least one processor and at least one memory including computer program code, the at least one memory and the computer program code configured to, with the processor, cause the IoT device to at least:
    detect a pressing of a button, the button being on an exterior of the IoT device of a customer, the pressing of the button being at least partially indicative of the customer requesting pickup of one or more items by one or more carrier entities at a current location of the customer;
    in response to the detecting of the pressing of the button, automatically detect, via a location sensor, current geolocation coordinates of the IoT device, the automatic detection of the current geolocation coordinates not requiring any other user input at the IOT device other than the pressing of the button;
    in response to the detecting of the pressing of the button and the detecting of the current geolocation coordinates, automatically transmit an electronic message to a network device, the electronic message includes an indication of the customer pickup of the one or more items at the current geolocation coordinates of the IoT device, the automatic transmission of the electronic message not requiring any other user input at the IOT device other than the pressing of the button; and
    receive an electronic acknowledgement message that includes at least one of: (i) a confirmation that the network device received the electronic message requesting pickup of the one or more items at the current geolocation coordinates of the IoT device and (ii) an estimated time of pickup determined by the network device based on the current geolocation coordinates of the IoT device and location of the vehicle.

13. The IoT device of claim 12, wherein the IoT device is further caused to present a light of a button to blink periodically for a predetermined time period.

14. The IoT device of claim 12, wherein the IoT device is further caused to present a visible indication comprising displaying, via a display device of the IoT device, the electronic message comprising confirmation that the network device received the message requesting pickup of the one or more items at the geolocation coordinates of the IoT device and indicating the estimated time of the pickup of the one more items at the geolocation coordinates of the IoT device.

15. The IoT device of claim 12, wherein the network device is a management computing entity operated by a carrier.

16. The IoT device of claim 12, wherein prior to the transmitting of the electronic message, the memory and the computer program code are further configured to, with the processor, cause the apparatus to:
  register, for a service provided by the network device based, in part, on the customer of the IoT device establishing a customer profile with the network device, the customer profile comprising indicia, specified by the customer, indicating at least one address that is a candidate for the one or more items to be picked up from.

17. The IoT device of claim 16, wherein the automatic transmitting of the electronic message to the network device causes the network device to determine that the at least one address of the customer in the customer profile corresponds to the current geolocation coordinates of the IoT device for the pickup of the one or more items.

18. The IoT device of claim 16, wherein the memory and the computer program code are further configured to, with the processor, cause the IoT device to:
  automatically generate an electronic shipping label for shipment of the one or more items to the particular destination address indicated in the customer profile stored on the network device in response to the receipt of the electronic acknowledgement message from the network device.

19. A system comprising:
  an Internet of Things device (IoT) device comprising at least one processor and at least one memory including computer program code, the at least one memory and the computer program code configured to, with the processor, cause the IoT device to:
  detect a pressing of a button, the button being on an exterior of the IoT device of a customer, the pressing of the button being at least partially indicative of the customer requesting pickup of one or more items by one or more carrier entities at a current location of the customer;
  in response to the detecting of the pressing of the button, automatically detect, via a location sensor, current geolocation coordinates of the IoT device, the automatic detection of the current geolocation coordinates not requiring any other user input at the IOT device other than the pressing of the button;
  in response to the detecting of the pressing of the button and the detecting of the current geolocation coordinates, automatically transmit an electronic message to a network device, the electronic message includes an indication of the customer pickup of the one or more items at the current geolocation coordinates of the IoT device, the automatic transmission of the electronic message not requiring any other user input at the IOT device other than the pressing of the button; and
  based at least in part on a network device receiving the electronic message, generate a visible indication at the IoT device that denotes to the customer, that the pickup of the one or more items has been scheduled to occur at the current geolocation coordinates.

20. The system of claim 19, wherein the at least one memory and the computer program code are further configured to, with the at least one processor, cause the IoT device to:
  automatically cause a printer to print an electronic shipping label in response to generating the electronic shipping label.

* * * * *